United States Patent [19]

Mundus et al.

[11] Patent Number: 5,468,333
[45] Date of Patent: Nov. 21, 1995

[54] APPARATUS FOR SEALING FILM WEBS OF A THERMOPLASTIC SYNTHETIC MATERIAL

[75] Inventors: Friedhelm Mundus, Lengerich; Hans-Ludwig Voss, Tecklenburg, both of Germany

[73] Assignee: Windmoeller & Hoelscher, Lengerich, Germany

[21] Appl. No.: 48,241

[22] Filed: Apr. 20, 1993

[30] Foreign Application Priority Data

Apr. 22, 1992 [DE] Germany .............................. 9205480 U

[51] Int. Cl.⁶ ...................................................... B32B 31/20
[52] U.S. Cl. ............................ 156/537; 156/323; 156/553
[58] Field of Search ..................................... 156/537, 553, 156/583.1, 323, 289

[56] References Cited

U.S. PATENT DOCUMENTS

| | | | |
|---|---|---|---|
| 2,767,769 | 10/1956 | Hasselquist | 156/553 |
| 3,196,068 | 7/1965 | Schoder | 156/537 |
| 3,379,595 | 4/1968 | Bracey | 156/323 |
| 3,567,550 | 3/1971 | Kannegiessei | 156/323 |
| 3,721,602 | 3/1973 | Bosse | 156/583.3 |
| 4,104,101 | 8/1978 | Garabedian | 156/323 |
| 4,674,266 | 6/1987 | Araki | 156/583.5 |
| 4,954,206 | 9/1990 | Voss | 156/537 |

FOREIGN PATENT DOCUMENTS

| | | | |
|---|---|---|---|
| 2915648 | 11/1980 | Germany | 156/583.1 |
| 1376195 | 12/1974 | United Kingdom | 156/323 |
| 2033296 | 5/1980 | United Kingdom | 156/537 |

*Primary Examiner*—Michael W. Ball
*Assistant Examiner*—Daniel J. Stemmer
*Attorney, Agent, or Firm*—Jacobson, Price, Holman & Stern

[57] ABSTRACT

An apparatus for sealing superposed film webs or flat lying tubular webs of a thermoplastic synthetic material, including sealing bars heatable by heating appliances, which are displaceable towards each other and away from each other and over whose front surfaces there can be spread a separating sheet of a material not sticking to the synthetic material.

12 Claims, 2 Drawing Sheets

APPARATUS FOR SEALING FILM WEBS OF A THERMOPLASTIC SYNTHETIC MATERIAL

FIELD OF THE INVENTION

The invention concerns an apparatus for sealing superposed film webs or flat lying tubular webs of a thermoplastic synthetic material, including sealing bars heatable by heating appliances, which are displaceable towards each other and away from each other and over whose front surfaces there can be spread a separating sheet of a material not sticking to the synthetic material, preferably TEFLON.

BACKGROUND OF THE INVENTION

With constantly heated sealing bars for providing sealing seams on film webs passed in a timed sequence between the bars, there occurs the problem that, during a temporary stoppage of the apparatus during which the sealing bars lifted off from the film web are kept at the operating temperature, the heat radiated by the bars melts the film web situated between the bars and which is not moved. To prevent such melting during operational stoppages, for example, during a lunch break, it is known from practice that heat-screening protective plates are moved in between the run out sealing bars and the film web situated between them which is to be provided with sealing seams. However, because of the narrow space available for installation, the arrangement of such protective plates, requires a high expenditure on design, which leads to a considerable increase in the cost of the apparatus, in particular when several sealing apparatuses are arranged one after the other, whereof those first in line preheat the film to be sealed and the last effects the final seal.

SUMMARY OF THE INVENTION

It is, therefore, the object of the invention to create an apparatus of the kind indicated at the outset, wherein one ensures without the installation of protective plates that heat radiated by the sealing bars during stoppage times does not damage a film web situated between the sealing bars that is not moving.

In accordance with the invention, this problem is solved in an apparatus of the generic kind in that provision is made for devices which, when the sealing bars are run out away from each other, lift the separating sheet off from the sealing bars.

If during times of stoppage of the apparatus the separating sheets are lifted off from the front surfaces of the sealing bars that are moved towards each other for producing the sealing seams, air cushions are formed in the gaps between the bars and the front surfaces, which cushions do, in spite of the heated sealing bars, keep the heat radiated by the sealing bars away from the film web to be sealed which is situated in the gap between the separating sheets, in such a way that the web is not melted or damaged.

Expediently, the lifting-off devices include guide rods or rollers arranged on both sides parallel to and interspaced from the sealing bars, which are displaceable between a welding position, wherein their peripheral surface lines facing each other lie approximately in the planes of the front surfaces of the sealing bars encompassed by them, and an inactive position wherein gaps are formed between the front surfaces and the planes defined by the guide rods or the like. The guide rods or the like may be displaceable in guideways of the supports of the sealing bars.

Expediently, the guide rods or the like deflect the separating sheet respectively drawn off from a roller and wound up on a roller.

According to an advantageous development, provision is made for rows of air-blast nozzles to be arranged on both sides of the conveyance plane of the webs to be sealed between the latter and the separating sheets, through which air can be blown continuously or in a timed sequence approximately parallel to the conveyance direction of the webs to be sealed.

Air-blast combs are known and serve, for example, for the free conveyance of one end of a web to be sealed, advanced by conveyance rollers, between the opened jaws of a welding or sealing apparatus. After a sealing seam or weld seam has been produced, they promote the detachment of the sealing seams from the sealing laws.

If the webs to be sealed are passed by conveyance rollers between the Sealing bars, the air-blast nozzles or air-blast combs only serve to detach the sealing seams from the sealing jaws, and in particular to cool the sealing seams. During times of stoppages, blast-air can be blown out continuously or in a timed sequence to prevent overheating. In addition, provision may be made for temperature sensors which during stoppage times activate the air-blast nozzles and switch them off as required.

During times of stoppages, there is no fundamental need for the sealing bars to be moved further away from each other than is the case during one step of conveying the film web to be sealed. However, during the stoppage times, care must be taken that sufficiently large gaps exist between the separating sheets and the film webs to be sealed on the one hand, and the separating sheets and the front surfaces of the sealing bars on the other hand.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
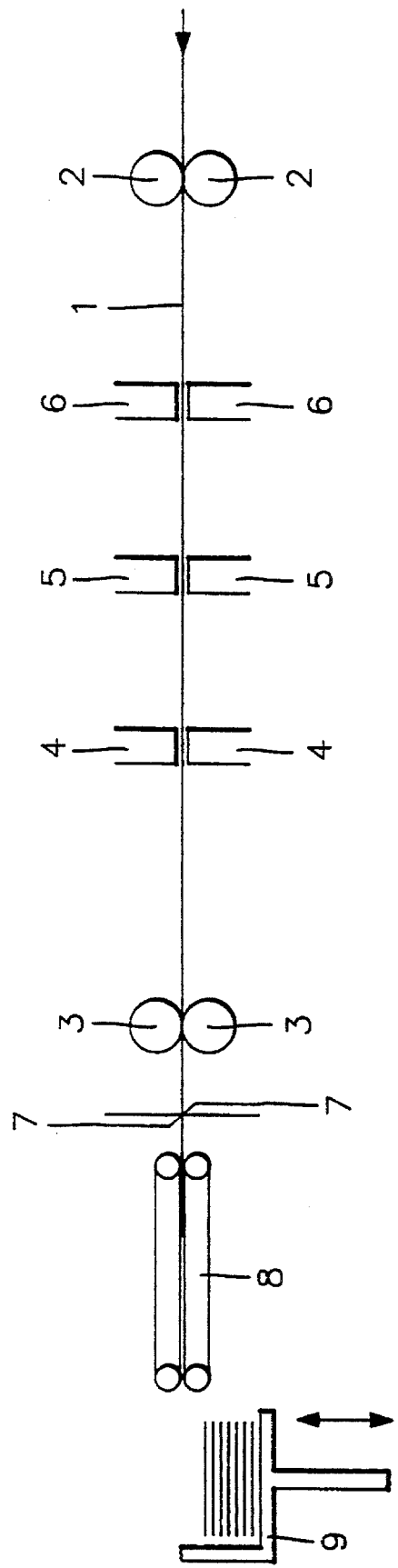
FIG. 1 is a schematic representation of a side view of a bag manufacturing machine having several sealing stations.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

In the installation according to FIG. 1, a flat lying tubular film web 1 drawn off from a stock roll, not shown, is provided with interspaced transverse sealing seams, and subsequently sack or bag workpieces are separated off from the tubular film web which are provided with transverse sealing seals, and are stacked.

The tubular film web 1 is drawn off from a stock roll by a drawing roller pair 2. It then passes in a timed sequence through three sealing stations arranged at predetermined distances one after the other, each containing pairs of sealing bars 4, 5, 6, the first two stations whereof serve for the preheating and the last station for the final execution of the transverse sealing seam. The conveyance of the tubular film web 1 to be provided with transverse sealing seams through the sealing stations is effected by a drawing roller pair 3 driven in a timed sequence.

The drawing roller pair 3 is followed down the line by a separating cutter arrangement 7 by means of which individual sections are separated from the laid flat and sealed tubular film web 1. These sections are then fed via a double belt conveyor 8 to a lowerable stacking table 9 and are stacked thereon in the usual way.

Figure 2:
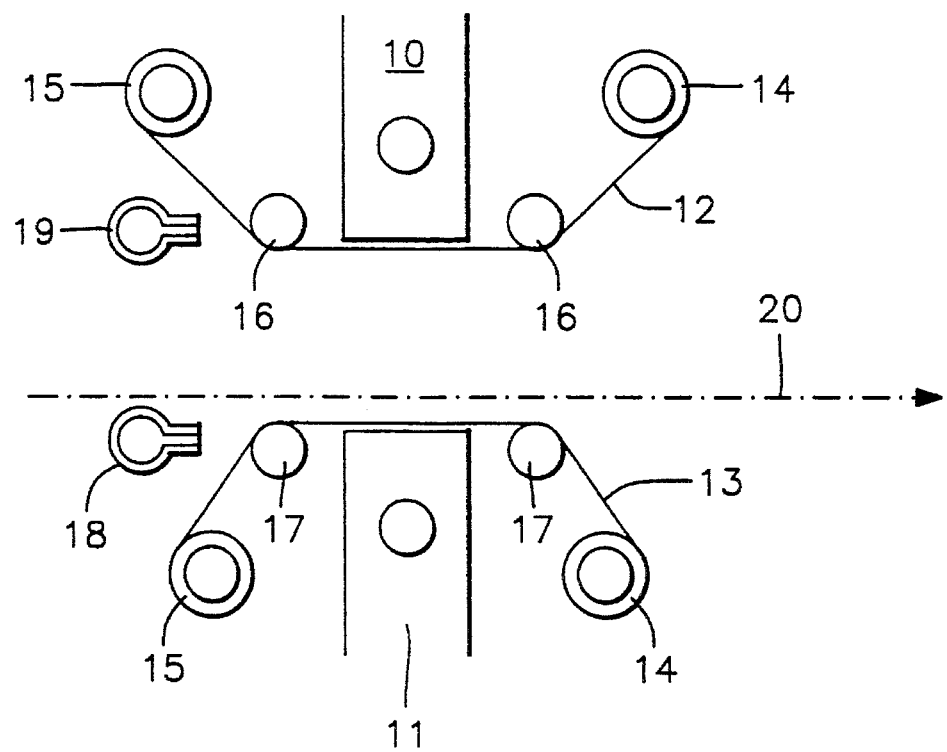
FIG. 2 is an enlarged representation of one of the sealing stations according to FIG. 1 during the sealing operation.

As shown in FIG. 2, in this arrangement each pair of sealing bars as schematically depicted as sealing bars 4, 5, 6 in FIG. 1, includes an upper sealing bar 10 and a lower sealing bar 11. Both sealing bars are at their front sides covered by a low sticking material band, such as a TEFLON band, 12 and 13 respectively, which firmly adhere to the sealing bars 10 and 11. On both sides of each sealing bar 10 and 11, respectively, provision is made for reels 14 and 15 so that at predetermined intervals, the TEFLON band 12 and 13 respectively can be moved on by a small amount, in that it is wound off from the reels 15 and wound up on the reels 14.

For guiding the TEFLON band 12 and 13 respectively, provision is made for guide rods 16 and 17 respectively which are arranged on both sides of the upper and lower sealing bar 10 and 11. As viewed in the conveyance direction, the sealing bars 10 and 11 are preceded by air-blast nozzles 18 and 19, by means of which one ensures that the film web 20 is detached after the sealing process from the TEFLON bands 12 and 13.

During operation of the apparatus represented in FIG. 1, the web 20 is drawn forward in a timed sequence, the sealing being effected during each stopping stage. For this purpose, the upper sealing bar 10, together with the guide rods 16, the reels 14 and 15 and the air-blast nozzle 19, moves downwards until the laid flat tubular film web 20 is pressed with the upper sealing bar 10 onto the lower sealing bar 11 which remains stationary during the operation of the machine. After the time required for the sealing, the sealing bar 10 together with the devices associated therewith moves back into its upper initial position. This process is repeated in a timed sequence.

Figure 3:
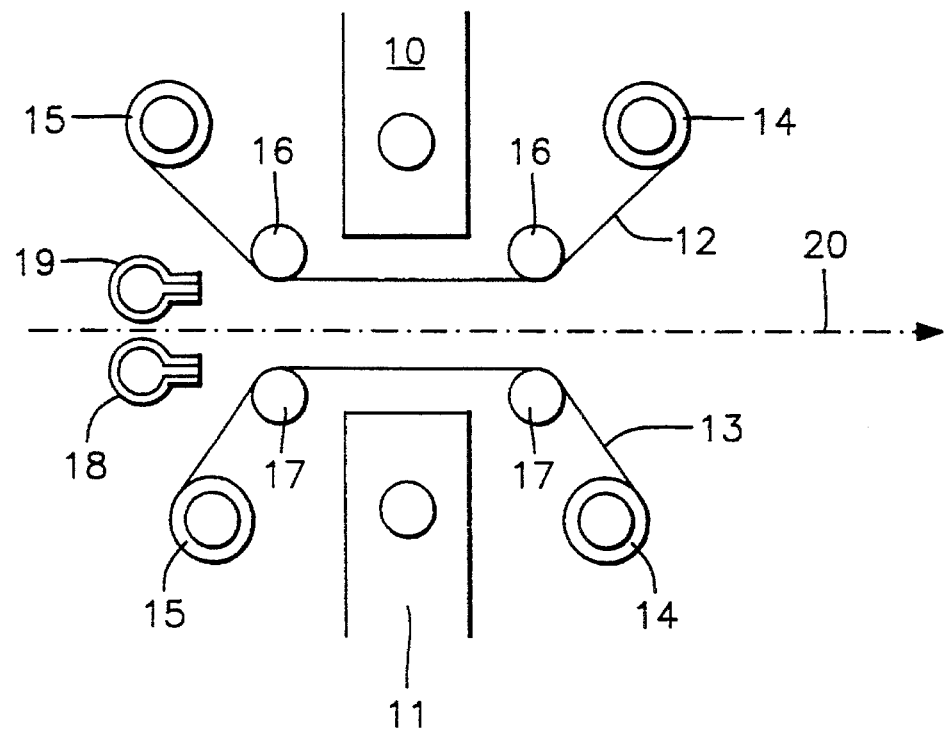
FIG. 3 is the sealing station shown in FIG. 2 during a stoppage of the apparatus while the sealing bars continue to be heated.

Now if, for example for the time of the lunch break, the machine is to be stopped, the temperature regulating devices for the two sealing bars must not be switched off, since otherwise, the heating time required during restarting would be too long. However, to nevertheless prevent the heat of radiation emanating from the sealing bars 10 and 11 from melting the film web situated between them, the sealing bars 10 and 11 and the TEFLON bands 12 and 13 are moved into the position represented in FIG. 3, whereby an air cushion is formed on the one hand between the sealing bars 10 and 11 and the TEFLON bands 12 and 13 and on the other hand, between the TEFLON bands 12 and 13 and the film web 20.

As has been proved by practical experiments, this air cushion is sufficient to screen the film web 20 adequately from the heat of radiation. If required, this measure can be further promoted in that a cooling airflow is constantly blown from the air-blast nozzles 18 and 19 or only in a timed sequence. To make it possible to form an idea regarding the paths through which the sealing bars and TEFLON bands respectively are moved towards each other, it should be pointed out that the laid flat tubular film web 20 occupies the same height level both in FIG. 2 and in FIG. 3.

Having described the invention, many modifications thereto will become apparent to those skilled in the art to which it pertains without deviation from the spirit of the invention as defined by the scope of the appended claims.

We claim:

1. An apparatus for sealing film webs of a thermoplastic synthetic material, said apparatus comprising:

two opposed heatable sealing bars displaceable towards each other and away from each other for sealing film webs passing between the two opposed heatable sealing bars, two separating sheets, each of said two separating sheets extending across and in contact with a front surface of a different one of said two sealing bars when said two sealing bars are in a welding position, said separating sheets being made of a non-stick material, means for removing the separating sheets from the front surfaces of the sealing bars to form air gaps between said sealing bars and said separating sheets when said two sealing bars are in a spaced apart, inactive position, and rows of air-blast nozzles arranged on both sides of a conveyance plane of the webs to be sealed and between the webs and the separating sheets through which air is blown approximately in a direction parallel to a conveyance direction of the webs, said means for removing including opposed guides arranged parallel to and spaced from both sides of each sealing bar so that the guides are displaceable between a welding position, where the front surfaces of the opposed guides lie approximately in a same plane as that of the front surface of each sealing bar, and the inactive position, where a gap is formed between the plane defined by the front surface of each sealing bar and the plane defined by the front surfaces of the opposed guides.

2. An apparatus according to claim 1, wherein the opposed guides define a path for each of the separating sheets and the opposed guides deflect the separating sheets as the separating sheets are drawn off from a reel and wound up on a reel.

3. An apparatus according to claim 1, wherein each of said two separating sheets are in contact with two guide rollers.

4. An apparatus according to claim 3, wherein said guide rollers are located between said two sealing bars in said inactive position.

5. An apparatus according to claim 1, wherein air blown by said nozzles is blown continuously.

6. An apparatus according to claim 1, wherein air blown by said nozzles is blown in timed sequence.

7. A device for sealing superposed sheets of thermoplastic plastic material, said device comprising:

two heatable sealing members movable toward and away from each other, two separating foils, each of said two separating foils being located on a front surface of a different one of said two heatable sealing members when said two sealing members are in a welding position, means for moving said two separating foils away from said two heatable sealing members when said heatable sealing members are moved apart so that said separating foils and said heatable sealing members are moved into a position in which a first insulating air cushion is formed between each separating foil and each heatable sealing member and a second insulating air cushion is formed between each of said separating foils and the sheets of thermoplastic material for the protection of the sheets from heat radiated by said two heatable sealing members, and rows of air-blast nozzles located to blow air into said second insulating air cushion in a direction parallel to a conveyance direction of the sheets.

8. An apparatus according to claim 7, wherein each of said two separating foils are in contact with the guide rollers.

9. An apparatus according to claim 8, wherein said guide rollers are located between said two sealing members.

10. An apparatus according to claim 7, wherein air blown by said nozzles is blown continuously.

11. An apparatus according to claim 7, wherein air blown by said nozzles is blown in timed sequence.

12. An apparatus according to claim 7, wherein one of said two sealing members is fixed in position.

* * * * *